(12) United States Patent
Takeuchi

(10) Patent No.: US 7,934,067 B2
(45) Date of Patent: Apr. 26, 2011

(54) DATA UPDATE HISTORY STORAGE APPARATUS AND DATA UPDATE HISTORY STORAGE METHOD

(75) Inventor: Tadashi Takeuchi, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 516 days.

(21) Appl. No.: 11/972,647

(22) Filed: Jan. 11, 2008

(65) Prior Publication Data

US 2009/0100239 A1   Apr. 16, 2009

(30) Foreign Application Priority Data

Oct. 15, 2007   (JP) ................................. 2007-268284

(51) Int. Cl.
*G06F 13/00*   (2006.01)
(52) U.S. Cl. .......................... 711/163; 711/154; 711/202
(58) Field of Classification Search .................. 711/163, 711/206, 154, 202
See application file for complete search history.

(56) References Cited

U.S. PATENT DOCUMENTS

2004/0268084 A1 * 12/2004 Longerbeam et al. ........ 711/206

OTHER PUBLICATIONS

Andy Hisgen, et al., New-Value Logging in the Echo Replicated File System, System Research Center, Jun. 23, 1993, Research Report 104, Digital Equipment Corporation, Palo Alto, California.

* cited by examiner

*Primary Examiner* — Yong Choe
(74) *Attorney, Agent, or Firm* — Antonelli, Terry, Stout & Kraus, LLP.

(57) ABSTRACT

Provided is a storage apparatus that stores data update histories using an existing file system without modifying the source code of the existing file system. The storage apparatus includes an I/O command catcher that changes, when an I/O command is issued from a program stored in a memory and arbitrary update data is stored in a data area address corresponding to a buffer address storing the arbitrary update data, authorized access set for the arbitrary update data in a page management unit to readable; and a page exception catcher that issues, when the authorized access of the arbitrary update data is changed to readable, a page exception report, acquires a data area address corresponding to the buffer address storing the arbitrary update data in the address management unit, and stores the update data and its update history in an update queue.

10 Claims, 12 Drawing Sheets

FIG.2

PAGE TABLE

| PAGE NUMBER (124A) | AUTHORIZED ACCESS (124B) |
|---|---|
| 0 | R |
| 1 | R/W |
| 2 | W |
| 3 | R |
| ⋮ | ⋮ |

HANDLER TABLE

| EVENT NAME (128A) | JUMP DESTINATION ADDRESS (128B) |
|---|---|
| SYSCALL RETURN | SYSTEM CALL CATCHER |
| I/O COMMAND | I/O REQUEST CATCHER |
| PAGE EXCEPTION REPORT | PAGE EXCEPTION CATCHER |

VM MANAGEMENT TABLE

| VM NUMBER | CACHE STRUCTURE SNOOP DRIVER NUMBER | UPDATE QUEUE NUMBER | DESCRIPTOR NUMBER | HBA NUMBER | LOG AREA NUMBER | DATA AREA NUMBER |
|---|---|---|---|---|---|---|
| 0 | 106-0 | 125-0 | 123-0 | 104-0 | 127-0 | 126-0 |
| 1 | 106-1 | 125-1 | 123-1 | 104-1 | 127-1 | 126-1 |
| ... | ... | ... | ... | ... | ... | ... |
| N | 106-N | 125-N | 123-N | 104-N | 127-N | 126-N |

DATA UPDATE HISTORY STORAGE APPARATUS AND DATA UPDATE HISTORY STORAGE METHOD

CROSS-REFERENCES TO RELATED APPLICATIONS

This application relates to and claims priority from Japanese Patent Application No. 2007-268284, filed on Oct. 15, 2007, the entire disclosure of which is incorporated herein by reference.

BACKGROUND

1. Field of the Invention

The invention relates generally to an apparatus that stores data update histories, and more specifically to a storage apparatus that includes a virtual machine monitor for storing data update histories based on a command from a file system.

2. Description of Related Art

Methods used for data update history storage apparatuses that store data update histories based on commands from existing file systems have been conventionally known, and one of these methods is disclosed in reference 1 (non-patent document: Andy Hisgen, et. al., "New-Value Logging in the Echo Replicated File System", Research Report 104, Systems Research Center, Digital Equipment Corporation).

FIG. 13 shows the outline of a method for a data update history storage apparatus 1300 disclosed in reference 1. In this conventional method, when a file handling unit 111" (including a file creation unit, a file deletion unit and a file edit unit) included in a file system 102" updates buffer data stored in a page area in a main memory, data update processing is started. Here, the "page area" means an area divided from the storage area of a buffer pool 121". The "buffer data" indicates data that is temporarily stored in the buffer pool 121" and will eventually be stored in data storage.

When the file handling unit 111" in the file system 102" declares the update of a page or commit of a transaction, a function call is issued to a page update register unit 211 or a transaction controller 212 included in a journaling library 201, and data update in a storage unit 105" is started.

The journaling library 201 includes the page update register unit 211, the transaction controller 212 and a log area writer 115".

When receiving update declaration regarding buffer data in the buffer pool 121" from the file handling unit 111", the page update register unit 211 registers in an update queue 125" the data area 126" block number (shown as "blkno" in FIG. 13) to be updated and update data (shown as "data" in FIG. 13) resulting from the update of the relevant buffer data in the buffer pool 121".

Also, when receiving the commit declaration of the update transaction, which has been performed by the file system 102" for the buffer data in the buffer pool 121", the transaction controller 212 registers a commit entry (shown as "commit" in FIG. 13) that defines the end of the transaction in the update queue 125".

The log area writer 115" stores a series of update histories 125"A … 125"N, which have been stored in the update queue 125, in a log area 127" in the storage unit 105". The storage unit 105" copies the update data contained in the update history 125"A stored in the log area 127 to the corresponding block number in the data area 126" and updates data in this data area 126".

By performing the above data update processing, data update performed by the file system 102" is constantly reflected in chronological order in the data area 126" in the storage unit 105". Even if the file system 102" or the journaling library 201 crashes during the copy of update data stored in the log area 127" to the data area 126", the data in the data area 126" can be easily recovered because the update history 125A" remains in the log area 127".

However, in order to store the update history in the log area in the storage apparatus, the file handling unit in the existing file system has to issue a function call for the page update declaration or the transaction commit declaration. Accordingly, the source code of the existing file system has to be modified, which requires a large development cost.

SUMMARY

It is an object of this invention to propose a data update history storage apparatus and a data update history storage method capable of storing update histories based on commands from an existing file system without modifying the source code of this existing file system.

In order to achieve the above object, provided according to an aspect of this invention is a data update history storage apparatus that stores update data, the apparatus including: a buffer pool that temporarily stores the update data; a page management unit that sets authorized access for each buffer address for buffer data stored in the buffer pool; an address management unit that manages the correlation between a buffer address where the update data is stored in the buffer pool and a data area address where the relevant update data will be stored; an I/O command catcher that changes, when an I/O command is issued from a program stored in a memory in order to store arbitrary data in a data area address corresponding to a buffer address storing that arbitrary update data, the authorized access that has been set for the corresponding arbitrary update data in the page management unit to be readable; and a page exception catcher that issues a page exception report when the authorized access set for the arbitrary update data is changed to readable, acquires the data area address corresponding to the buffer address that stores the arbitrary update data from the address management unit, and stores the update data and an update history of that update data in an update queue.

With the above arrangement, when update data is stored in the buffer pool, that update data can be stored in a data area based on a program in the data update history storage apparatus without modifying the source code of an existing file system.

Provided according to another aspect of this invention is a data update history storage method for a data update history storage apparatus that stores update data, the method including: a storing step of temporarily storing the update data in a buffer pool; a page management step of setting authorized access for each buffer address for buffer data stored in the buffer pool; an address management step of managing the correlation between a buffer address where the update data is stored in the buffer pool and a data area address where the relevant update data will be stored; an I/O command catching step of changing, when an I/O command is issued from a program stored in a memory in order to store arbitrary data in a data area address corresponding to a buffer address storing that arbitrary update data, the authorized access that has been set for the corresponding arbitrary update data in the page management unit to be readable; and a page exception catching step of issuing a page exception report when the authorized access set for the arbitrary update data is changed to readable, acquiring the data area address corresponding to the buffer address that stores the arbitrary update data from the address management unit, and storing the update data and an update history of this update data in an update queue.

With the above arrangement, when update data is stored in the buffer pool, that update data can be stored in a data area based on a program in the data update history storage apparatus without modifying the source code of an existing file system.

The outline of the data update history storage apparatus will be described below.

The data update history storage apparatus includes a NAS head unit and a storage unit. The NAS head unit is installed with a memory, a CPU and an HBA.

The CPU functions to provide I/O commands and system call return commands issued, based on a program (e.g., a file system) in a memory, to another program (e.g., a VM monitor).

The CPU also functions to check a page table stored in the memory and to provide, when the program in the memory (e.g., the file system) accesses a buffer in the memory, the accessed buffer address and a page exception occurrence report to another program (e.g., the VM monitor) stored in the memory.

The HBA functions to refer to a descriptor in the memory and to transfer the buffer data whose address is specified in the descriptor to a storage apparatus.

The program (e.g., the file system) in the memory has a management table (address management unit) that manages the correlation between the buffer addresses in the memory and the numbers assigned to storage blocks in which the relevant buffers are to be stored.

When an I/O command is issued from the program (e.g., the profile system) in the memory, another program (e.g., VM monitor) is started based on a report about this command issue provided from the CPU in the NAS head unit and refers to the descriptor in the memory to acquire the buffer address that is the data source relating to this I/O command. In addition, the other program (e.g., VM monitor) includes a component that updates a page table (page management unit) in the memory so that a page exception report will be generated when the program (e.g., file system) in the memory updates the relevant buffer in the future.

When the CPU updates data in the buffer pool in the memory after the above page table update, another program (e.g., VM monitor) is started based on a page exception occurrence report from the CPU, refers to the management table managed by the program (e.g., file system) in the memory, and acquires the storage block number corresponding to the buffer address storing the relevant buffer data. Another program (e.g., VM monitor) further includes a component that registers in a queue a combination of the update data stored in the relevant buffer address and the block number.

Another program (e.g., VM monitor) includes a component that is started, when a system call return command is issued based on the program (e.g., file system) in the memory and a report about this command issue is received from the CPU, and registers a commit entry in the queue.

Another program (e.g., VM monitor) includes a component that transfers queued entries to the storage apparatus.

According to this invention, an update history can be stored and data update can be performed based on an existing file system without modifying the source code of the existing file system.

Other aspects and advantages of the invention will be apparent from the following description and the appended claims.

BRIEF DESCRIPTION OF THE DRAWINGS

FIG. 2 is a diagram showing a page table in the above first embodiment.

FIG. 3 is a diagram showing a handler table in the above first embodiment.

FIG. 12 is a diagram showing a VM management table in the above third embodiment.

DETAILED DESCRIPTION OF PREFERRED EMBODIMENTS (1) First Embodiment (1-1) Configuration of Data Update History Storage Apparatus A first embodiment of this invention will be described with reference to FIGS. 1 to 9.

Figure 1:
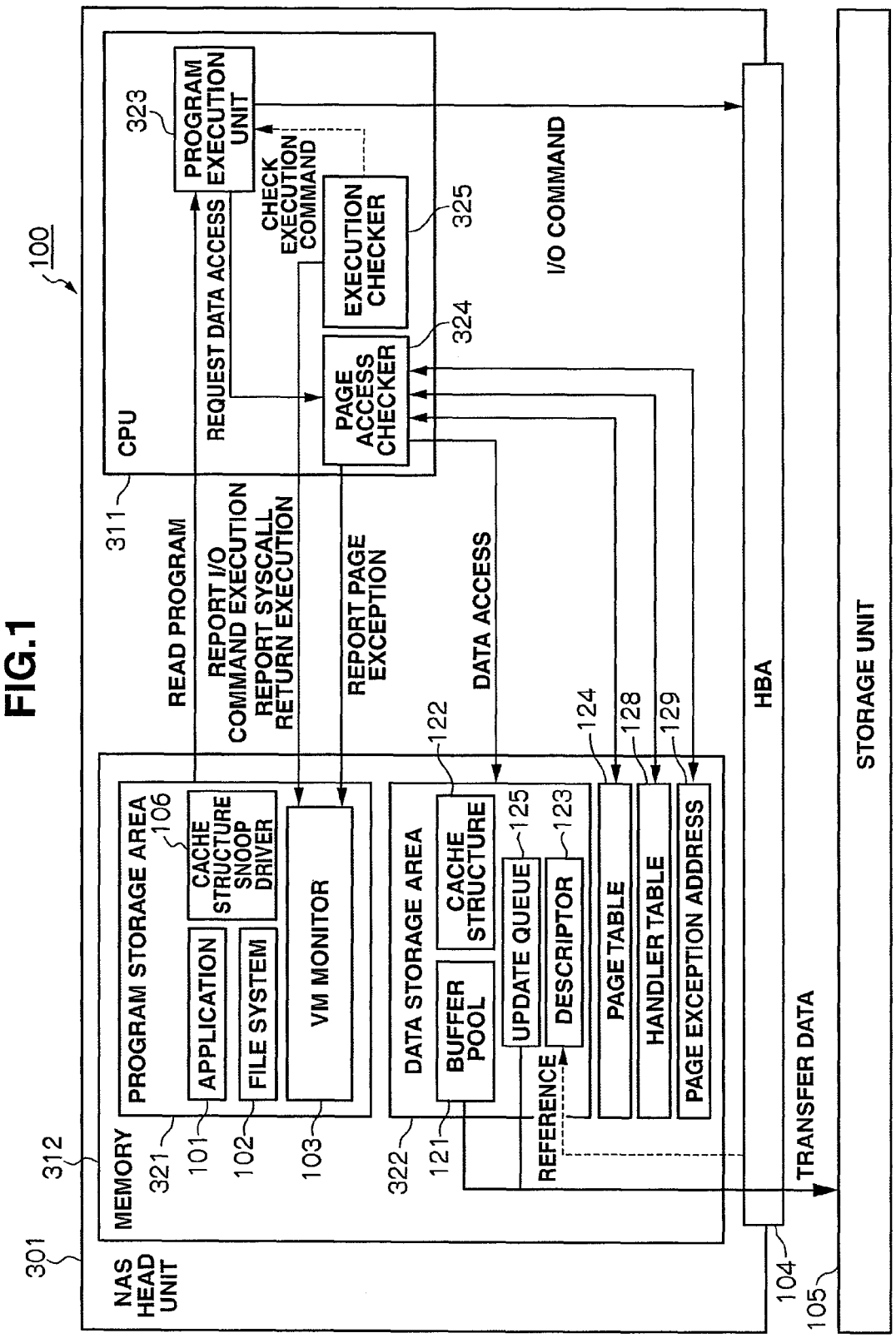
FIG. 1 is a block diagram showing the hardware configuration of a data update history storage apparatus according to a first embodiment of this invention.

First, FIG. 1 shows a basic hardware configuration on which the first embodiment is predicated.

The reference numeral 100 denotes a data update history storage apparatus in this embodiment. The data update history storage apparatus 100 includes a NAS (Network Attached Storage) head unit 301 and a storage unit 105. The NAS head unit 301 includes a CPU (Central Processing Unit) 311 and a memory 312.

The CPU 311 includes a program executer 323, a page access checker 324 and an execution checker 325. The memory 312 includes a program storage area 321 and a data storage area 322.

The program storage area 321 stores: an application 101 that runs on a basic software and provides a function for accomplishing a particular purpose; a file system 102 that manages data to be stored in the storage unit 105; a VM monitor 103 that updates data in the data update history storage apparatus 100; and a cache structure snoop driver 106 that controls a cache structure 122 (to be described later).

The data storage area 322 stores a buffer pool 121 that stores update data based on commands from the file system 102, a cache structure 122, a descriptor 123, a page table 124, an update queue 125, a handler table 128 and a page exception address 129.

The cache structure 122 stores information including the block number of a data area in which update data is to be stored and the buffer address where the update data is stored.

The descriptor 123 stores, like the cache structure 122, information including the block number of a data area in which the update data is to be stored and the buffer address where the update data is stored.

As shown in FIG. 2, the page table 124 includes: a page area number field 124A showing the page area number of a page area that is an area divided from the buffer pool 121 area; and an authorized access field 124B showing authorized access for update data to be stored in the relevant page area. The page area number 124A is a buffer address. For example, in FIG. 2, the page area "0" indicates that only read access to the "0" page area is permitted, i.e., update data stored in the "0" page area can be read. On the other hand, write access to the "0" page area is not permitted, i.e., update data cannot be written to the "0" page area, so a later-described page exception report is issued from the page access checker 324 in response to write access, and the address of the "0" page area is registered as being a page exception address 129.

The update queue 125 stores an update history including update data stored in the buffer pool, the block number of the data area in which the relevant update data is to be stored and a commit entry for defining the end of the update data set.

As shown in FIG. 3, the handler table 128 includes: an event name field 128A showing an event name issued from the page access checker 324 or the execution checker 325 in the CPU; and a jump destination address field 128B showing the jump-destination address of a program section that will be executed, from among various program sections created in the VM monitor 103, based on the relevant event name.

For example, if an event name "syscall return" is issued from the execution checker 325, the data update processing jumps to the system call catcher 114 in the VM monitor 103, and the CPU 311 executes a program related to the system call catcher 114. If an event name "I/O command" is issued from the execution checker 325, the data update processing jumps to the I/O request acquirer 112 in the VM monitor 103, and the CPU 311 executes a program related to the I/O request acquirer 112. If an event name "page execution report" is issued from the page access checker 324, the data update processing jumps to the page exception catcher 113 in the VM monitor 103, and the CPU 311 executes a program related to the page exception catcher 113.

The page exception address 129 is the page address of an arbitrary page area to which access other than predetermined authorized access is attempted by the page access checker 324. At this time, a page exception report (to be described later) is issued from the page access checker 324 and the address of the arbitrary page area which has denied the access is registered as being a page exception address.

When the CPU 311 reads a program (file system, etc.) in the program storage area 321, the program executer 323 executes the read program. The program executer 323 issues a data access request to the data storage area 322 in the memory 311 during the execution of the program. Then the page access checker 324 accesses a certain page area in the data storage area 322 in the memory 311. Here, the page access checker 324 refers to the later-described page table 124 and checks the authorized access of the page area it has accessed, and if it is determined that this access is unauthorized, the page access checker 324 issues a page exception report to the relevant program stored in the program storage area 321. Also, a page exception address (i.e., the address which the program executer 323 has tried to access) may be provided to the program together with the above page exception report. The execution checker 325 in the CPU 311 catches an I/O command and a system call return command executed by the program executer 323 and may inform the relevant programs in the program storage area 321 that these commands are issued by the program executer 323.

The NAS head unit 301 is connected to an HBA (Host Bus Adapter) 104. After setting in the descriptor 123 in the data storage area 322 the address of a data area (data source) and the storage unit 105 block number in which the relevant data is to be stored, the program executer 323 issues an I/O command issued from the relevant program to the HBA 104. The HBA 104 refers to the descriptor 123 in the data storage area 322, and transfers the data stored in the specified address in the data storage area 322 to the specified block in the storage unit 105.

Next, the outline of a data update history storage method in this embodiment will be described. This data update history storage method is executed by the CPU 311 based on the programs 101 to 103 and 106 stored in the program storage area 321.

(1-2) Data Update History Storage Method

Figure 4:
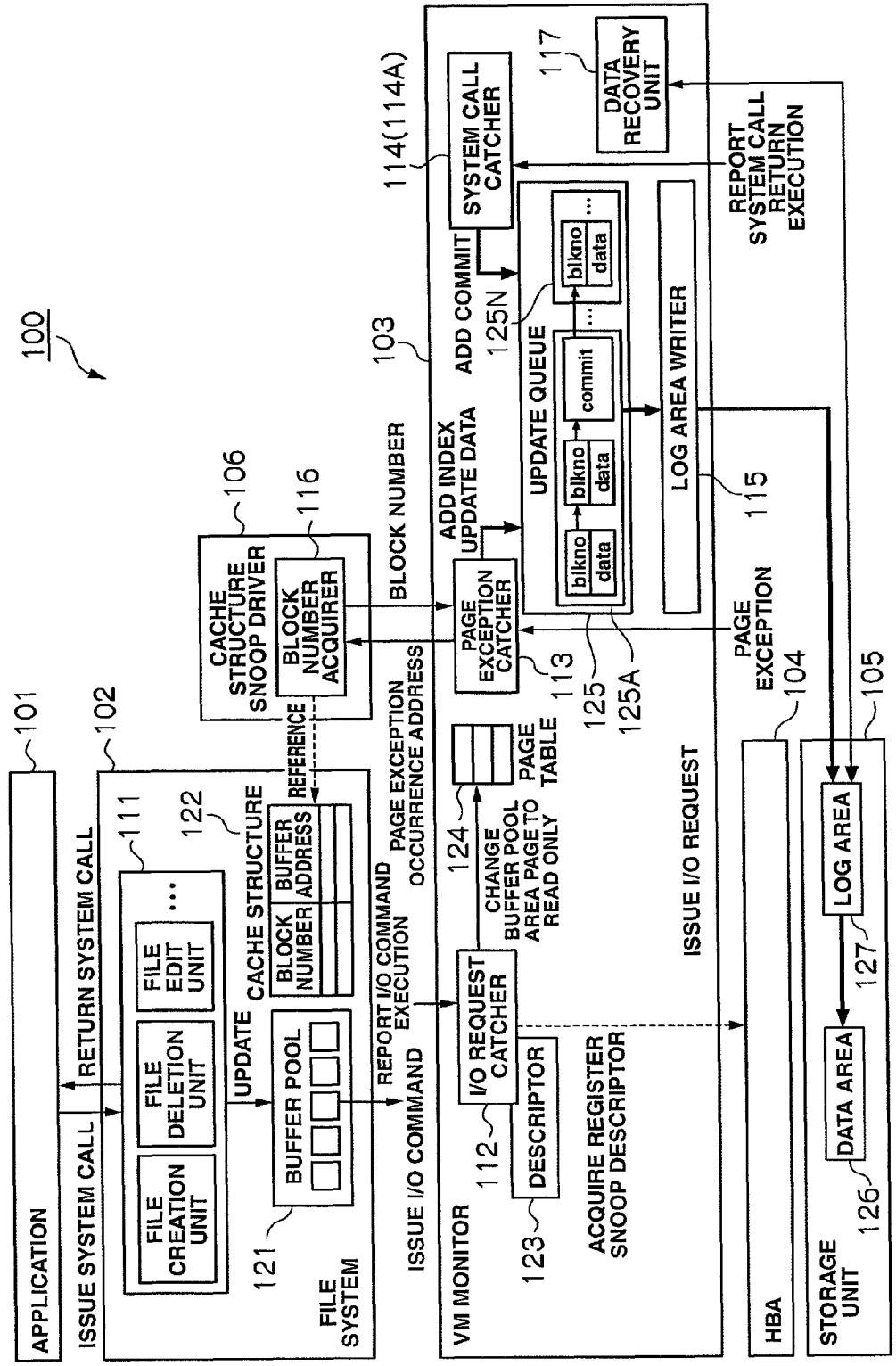
FIG. 4 is a block diagram showing the software configuration of the data update history storage apparatus in the above first embodiment.

FIG. 4 is a diagram hierarchically showing the software configuration in the data update history storage apparatus. The CPU 311 makes a request to the file handling unit 111 to perform file handling by issuing a system call via the application 101. When the file handling is completed and data in the relevant file becomes up-to-date, the CPU 311 issues a system call return to the application 101 via the file system 102.

When updating relevant buffer data stored in the buffer pool 121 in response to the request from the application 101, the components 323 to 325 in the CPU 311 perform update processing (to be described below) in order to store update data in the data area 126 in the storage unit 105. First, the program executer 323 issues an I/O command to the HBA 104 based on the buffer address information registered in the cache structure 122. At this time, the CPU 311 registers in the descriptor 123 a combination of a buffer address and a block number to which update data stored in this buffer address is to be transferred.

When the CPU 311 issues an I/O command to the HBA 104 via the file system 102, the execution checker 325 provides the VM monitor 103 with an I/O command execution report. This I/O command execution report is received by the I/O request catcher 112 in the VM monitor 103. The CPU 311 refers to the setting content in the descriptor 123 using the I/O request catcher 112 and acquires the buffer address that is the transfer source. Then the CPU 311 changes the setting in the page table 124 using the I/O request catcher 112 so that the page access checker 324 will be able to issue a page exception report to the VM monitor 103 when the CPU 311 makes unauthorized access to the relevant buffer address via the file system 102. Specifically, the CPU 311 changes the authorized access of the relevant buffer address from readable/writable or writable to just readable (read only).

Accordingly, every time the CPU 311 updates the buffer data in this buffer address in the buffer pool 121 using the file handling unit 111, a page exception report will be provided to the VM monitor 103. This page exception report is received by the page exception catcher 113 in the VM monitor 103.

When the CPU 311 receives the page exception report with the page exception catcher 113, the CPU 311 also receives a page exception address (corresponding to the buffer address) together with this page exception report. The CPU 311 provides this page exception address to the cache structure snoop driver 106, and calls the driver 106.

The CPU 311 refers to the cache structure 122 managed by the file system 102 and acquires the block number corresponding to the relevant buffer address with a block number acquirer 116. Then the CPU 311 reports the block number acquired by the block number acquirer 116 to the page exception catcher 113. The CPU 311 registers in the update queue 125 the update data stored in the page exception address (buffer address) and the block number that have been received by the page exception catcher 113 from the cache structure snoop driver 106.

When the CPU 311 issues a system call return to the application 101 via the file system 102, the execution checker 325 transmits a system call return command execution report to the VM monitor 103. When receiving this system call return command execution report, the system call catcher 114 in the VM monitor 103 registers a commit entry in the update queue 125.

The CPU 311 writes the content of the update queue 125 in the log area 127 in the storage unit 105 using a log area writer 115. When finishing writing in the log area 127 all the update histories up to the commit entry, the CPU 311 copies all the update data written in the log area in the corresponding data area 126 to store the update data.

If a failure occurs in the data update history storage apparatus, the CPU 311 starts a data recovery unit 117 after rebooting the system. The data recovery unit 117 recovers data in the data area 126 based on the update history stored in the log area 127.

(1-3) Operation Flowcharts

Next, how the CPU 311 stores update data in the data area using the above-described components 112 to 117 in the VM monitor 103 will be described in detail.

(1-3-1) Operation of I/O Request Catcher 112

Figure 5:
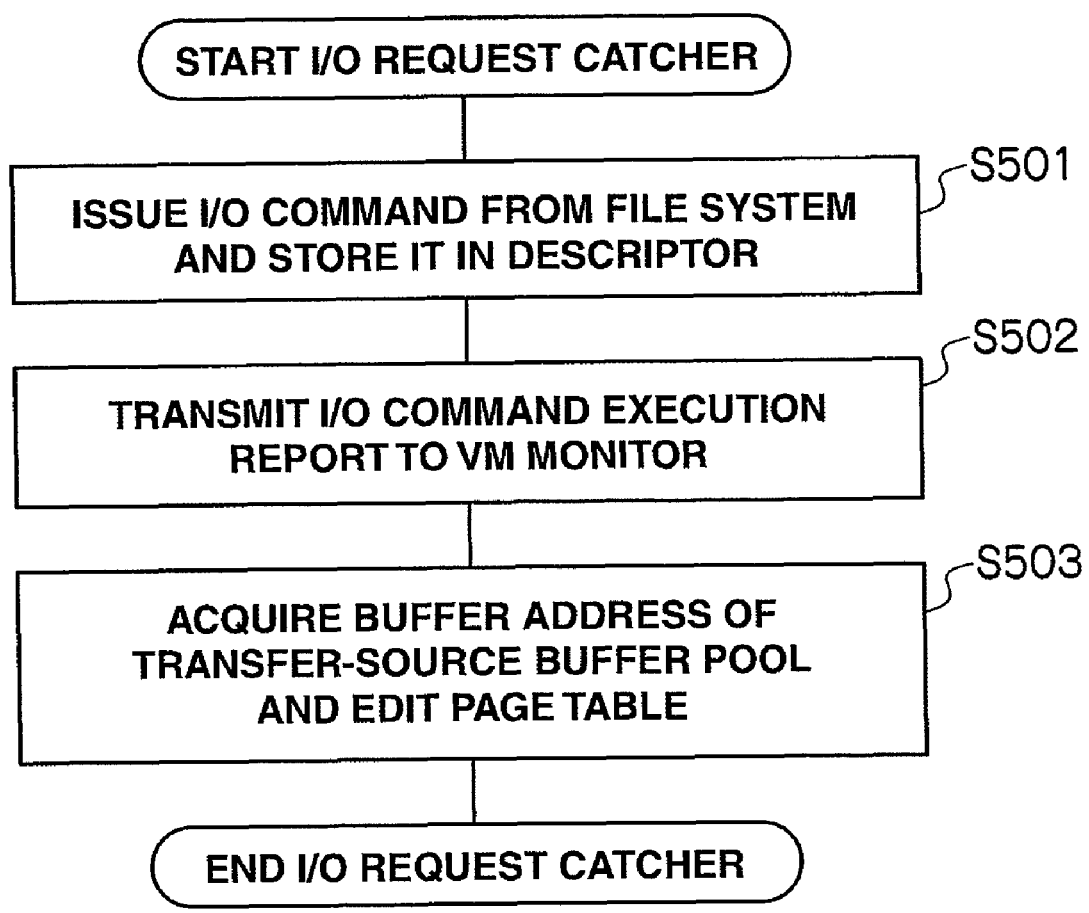
FIG. 5 is a flowchart showing the operation of an I/O request catcher in the above first embodiment.

FIG. 5 is a flowchart showing the operation of the I/O request catcher 112 when the CPU 311 issues an I/O command from the file system 102.

First, the CPU 311 issues an I/O command to the HBA 104 using the file system 102 and tries to store buffer data (update data) stored in the buffer pool 121 in the storage unit 105 (S501). At the same time, the CPU 311 also stores, in the descriptor 123 in the data storage area 322 in the memory 312, the combination of the relevant buffer address and the data area 126 block number to which the content of the relevant buffer data is to be stored (S501).

The execution checker 325 catches the I/O command issued in step S501 and reports this I/O command to the I/O request catcher 112 in the VM monitor 103 (S502).

The CPU 311 checks the descriptor 123 and acquires the buffer address that has been registered in the descriptor 123 (S503). Then the CPU 311 edits the page table 124 in the memory 312 to change the authorized access of the relevant buffer address to be only readable (read only) (S503) and terminates the operation of the I/O request catcher 112.

(1-3-2) Operation of Page Exception Catcher

Figure 6:
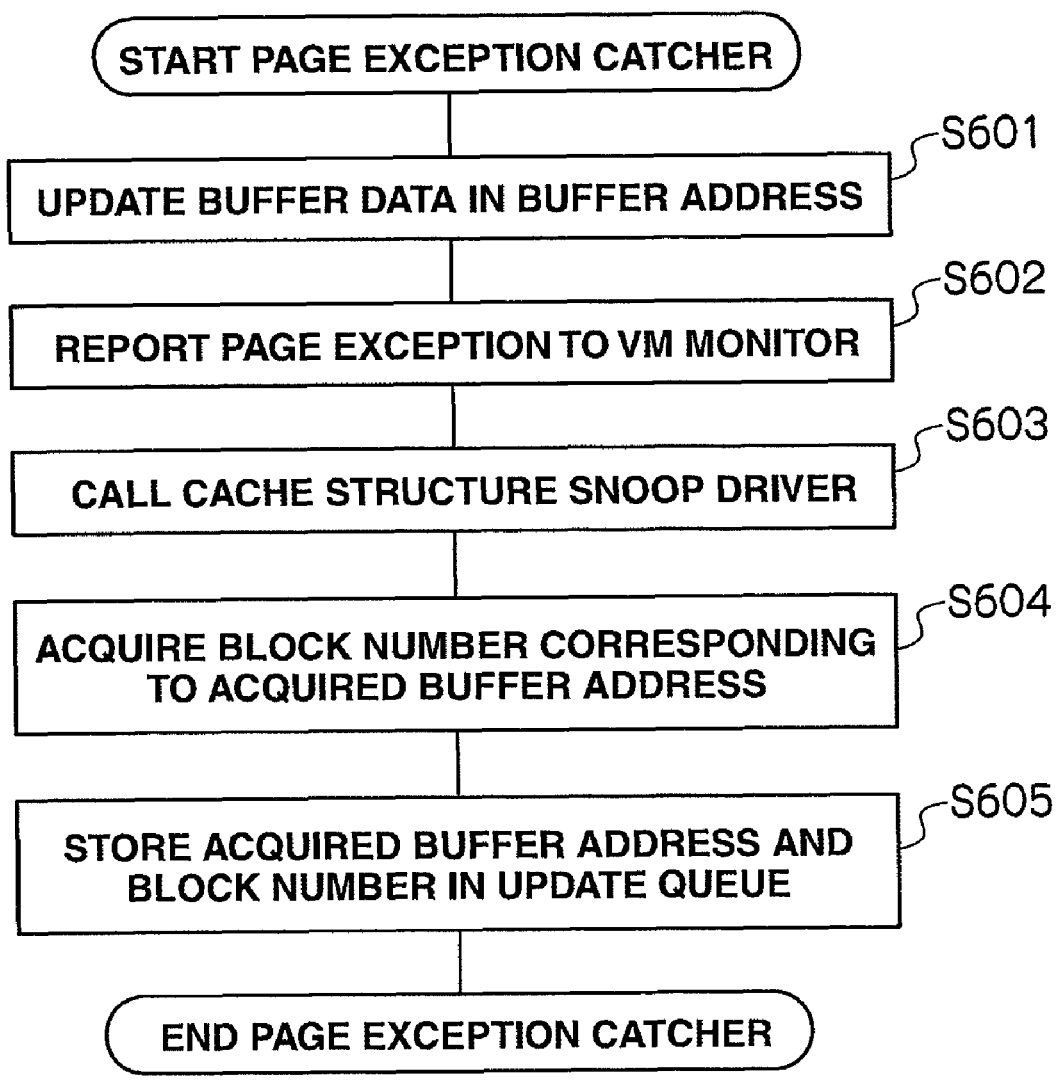
FIG. 6 is a flowchart showing the operation of a page exception catcher in the above first embodiment.

FIG. 6 is a flowchart showing the operation of the page exception catcher, which is started after the CPU 311 edits the page table 124 in step S503 in FIG. 5.

Specifically, first, the CPU 311 updates data in the relevant buffer address in the buffer pool 121 using the file handling unit 111 (S601).

Since the CPU 311 has changed the authorized access of this buffer address to be only readable (read only), the above update access is denied and the page access checker 324 issues a page exception report to the page exception catcher 113. At the same time, the page access checker 324 also provides the page exception catcher 113 with a page exception address 129, which is the buffer address that has denied the above update access (i.e., the buffer address that has been updated by the file handling unit in step S601) together with the page exception report (S602).

Then the CPU 311 calls the cache structure snoop driver 106 based on the buffer address that has been registered as the reported page exception address 129 (S603).

The cache structure snoop driver 106 refers to the cache structure 122 managed by the file system 102 to acquire the data area 126 block number corresponding to the relevant buffer address and reports that block number to the page exception catcher 113 (S604).

The CPU 311 registers in the update queue 125 the update data including the block number acquired in step S604 and the buffer data after update stored in the relevant buffer address (S605) and terminates the operation of the page exception catcher.

(1-3-3) Operation of System Call Catcher

Figure 7:
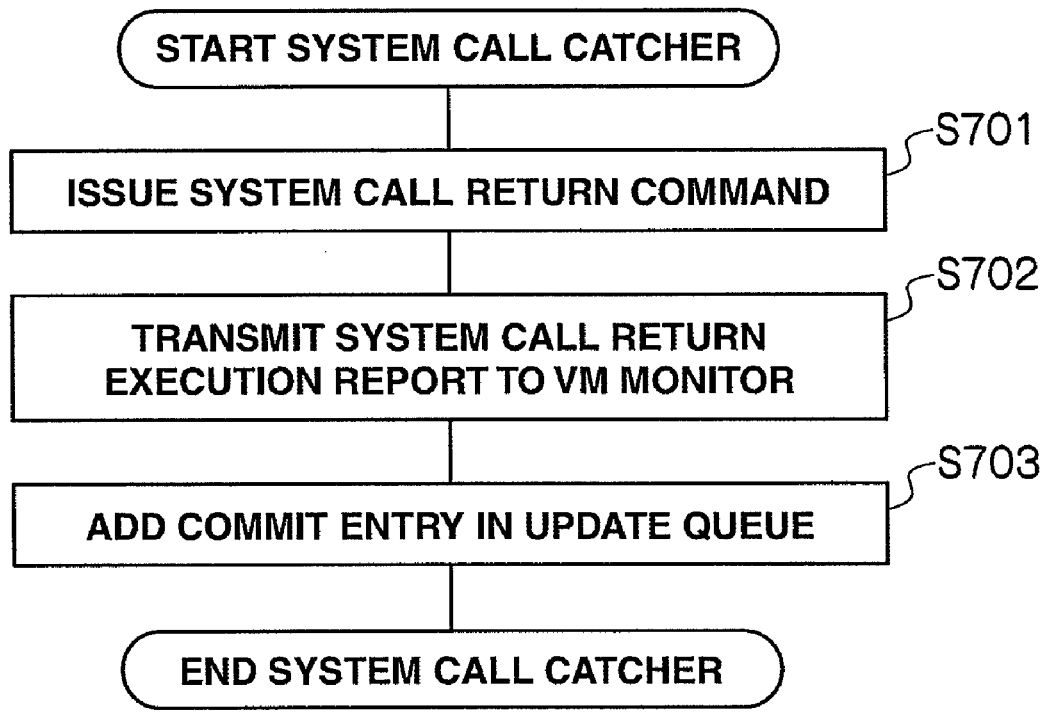
FIG. 7 is a flowchart showing the operation of a system call catcher in the above first embodiment.

FIG. 7 is a flowchart showing how the CPU 311 executes the operation of the system call catcher.

Specifically, this flowchart shows the operation of the system call catcher when the CPU 311 issues a system call return command to the application 101 using the file handling unit 111.

First, when the update of the buffer data in the buffer pool 121 is completed, the CPU 311 issues a system call return command to the application 101 using the file handling unit 111 (S701).

Then the execution checker 325 transmits a system call return command execution report to the system call catcher 114 (S702).

When storing a commit entry that indicates the end of a series of update data in the update queue 125 (S703), the CPU 311 terminates the operation of the system call catcher 114.

(1-34) Operation of Log Area Writer

Figure 8:
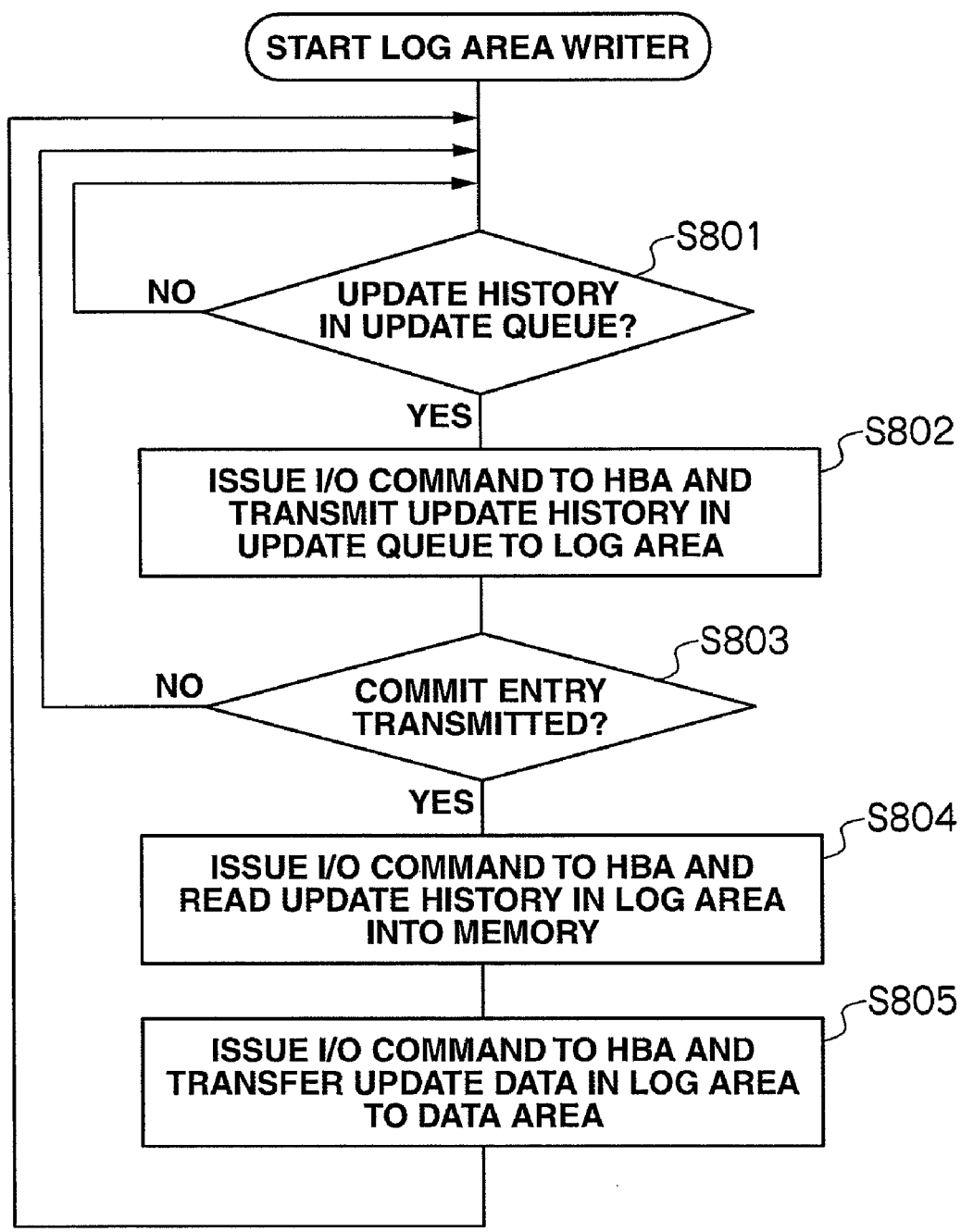
FIG. 8 is a flowchart showing the operation of a log area writer in the above first embodiment.

FIG. 8 is a flowchart showing how the CPU 311 executes the operation of the log writer 115.

The CPU 311 checks whether there is update history stored in the update queue 125 (S801). If there is no stored update history (S801: NO), the CPU 311 repeats the operation in step S801.

If there is stored update history (S801: YES), the CPU 311 issues an I/O command to the HBA 104 and transmits the update history in the update queue 125 to the log area 127 (S802). The CPU 311 deletes the transmitted update history from the update queue 125.

Next, the CPU 311 checks whether or not the transmitted update history is a commit entry (S803). If the update history transmitted by the CPU 311 is not a commit entry (S803: NO), the process returns to step S801.

If the transmitted update history is a commit entry (S803: YES), the CPU 311 issues an I/O command to the HBA 104 and transmits the update history(s) stored in the log area 127 to an unoccupied area in the data storage area 322 in the memory 311 (S804).

The CPU 311 issues an I/O command to the HBA 104 and transmits update data from the update history stored in the log area 127 to the corresponding block number in the data area 126 (S805), and when this processing is completed, the CPU 311 returns to step S801.

(1-3-5) Operation of Data Recovery Unit

Figure 9:
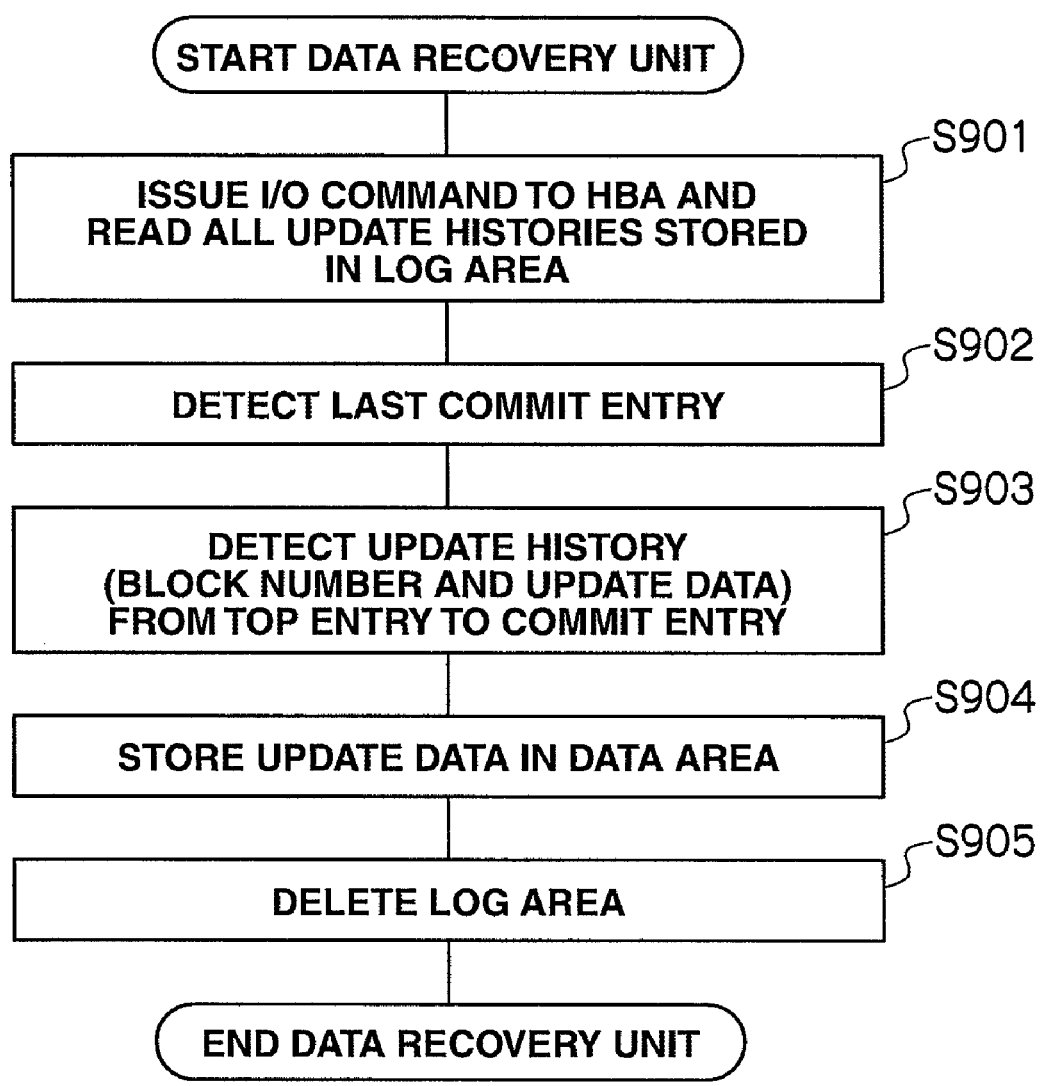
FIG. 9 is a flowchart showing the operation of a data recovery unit in the above first embodiment.

FIG. 9 is a flowchart showing how the CPU 311 executes the data recovery unit when a failure occurs in the data update history storage apparatus 100 while update data is being stored in the data area 126.

The CPU 311 issues an I/O command (read command) to the HBA 104, and reads all the update histories (the data area block numbers and update data that have been transmitted from the update queue) stored in the log area 127 (S901).

The CPU 311 detects the last commit entry from the read update history (S902). The CPU 311 detects an entry that indicates the history of the update data from the update history up to the detected commit entry, and detects the data area 126 block number and the update data (S903).

Based on the detected data area 126 block number and update data, the CPU 311 stores this update data in the data area 126 (S904).

When the recovery of all data is complete, the CPU 311 deletes the update histories stored in the log area 127 (S905), and terminates the operation of the data recovery unit.

As described above, by simply installing the VM monitor 103 and the cache structure snoop driver 106 in the program storage area 321 in the NAS head unit 301, update data can be stored in the storage unit 105 without modifying the existing file system. In other words, by operating the existing application 101 or file system 102 in the data update history storage apparatus 100, which includes the combination of the above-described NAS head unit 301 and storage unit 105, an update history can be automatically stored in the log area 127 and update data can be stored in the data area 126 without issuing a function call from the existing application 101 or file system 102. In addition, data can be recovered based on the update history in the log area 127.

This data update history storage method can be used in a performance analysis application by additionally employing time stamps, etc. In addition, the update history can be used for data backup or data protection. Furthermore, the update history can be used for failure analysis. As described above, since the function enhancement can be realized without modifying the existing file system, development costs can be greatly reduced.

(1-4) Advantage of First Embodiment

According to the above method, update histories can be stored and data can be updated based on a command from the existing file system without modifying the source code of the existing file system.

(2) Second Embodiment

Next, a second embodiment will be described below. The second embodiment has the same configurations and operations as those in the first embodiments except for the operation flow of the system call catcher described in the above first embodiment, so explanations for those same configurations and operations will be omitted. Like components are assigned like reference numerals from the above first embodiment.

(2-1) Operation of System Call Catcher

Figure 10:
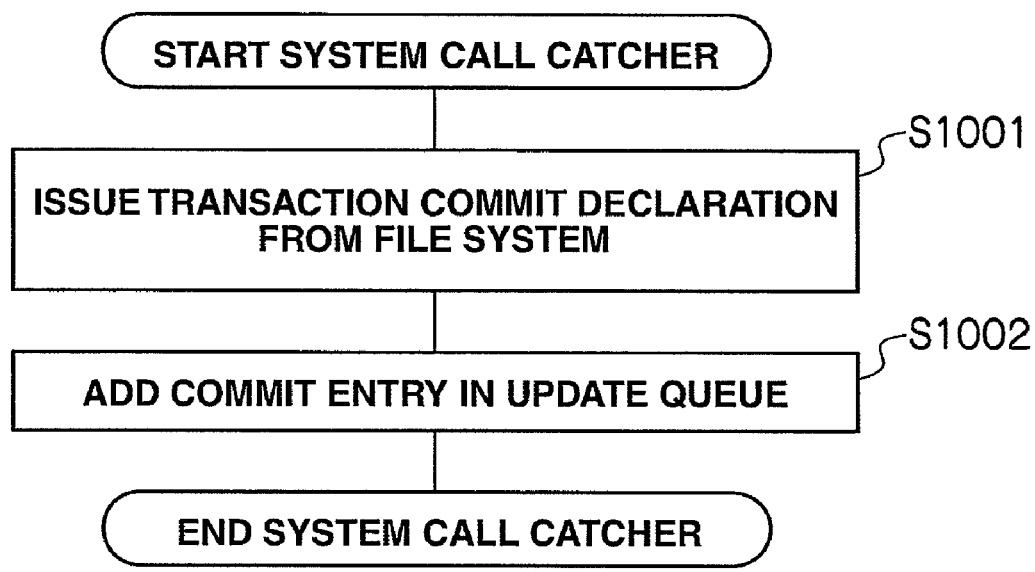
FIG. 10 is a flowchart showing the system call catcher in a second embodiment.

FIG. 10 is a flowchart showing how the CPU 311 executes the operation of a system call catcher 114A (shown in FIG. 4).

The CPU 311 starts the system call catcher 114A in response to a commit declaration issue for a transaction from the file system 102 (S1001). The CPU 311 adds a commit entry to the update queue 125 (S1002) and terminates the operation of the system call catcher 114A.

Although the CPU 311 starts the system call catcher 114 in response to a system call return command issue from the file handling unit 111 in the above first embodiment, the CPU 311 may start the system call catcher 114A in response to the transaction commit declaration issue as described in this embodiment.

(2-2) Advantage of Second Embodiment

According to the above method in this embodiment, an update history can be stored and data update can be performed based on a command from the existing file system without modifying the source code of the existing file system.

(3) Third Embodiment

Figure 11:
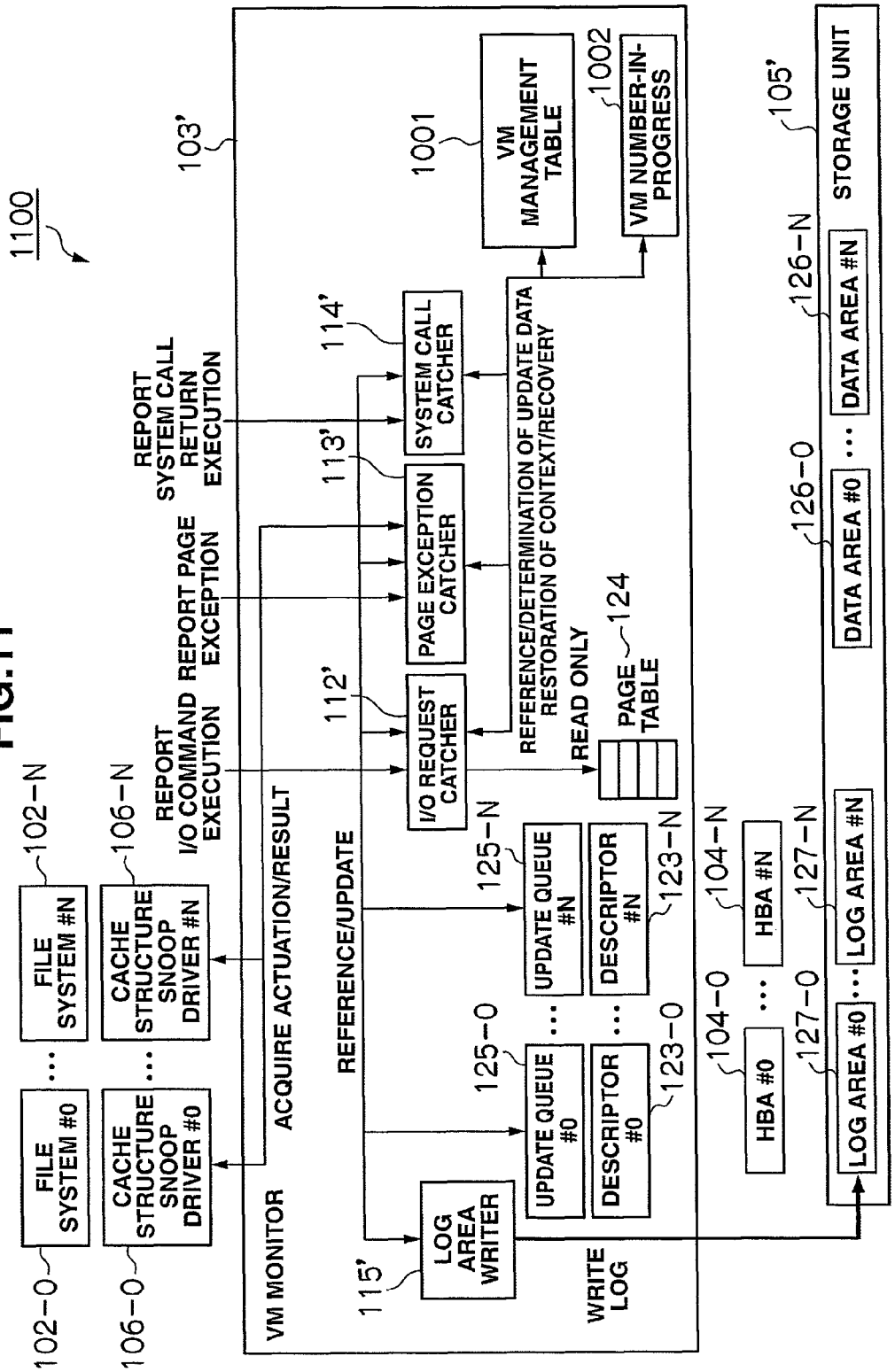
FIG. 11 is a block diagram showing the software configuration of a data update history storage apparatus according to a third embodiment.
Figure 13:
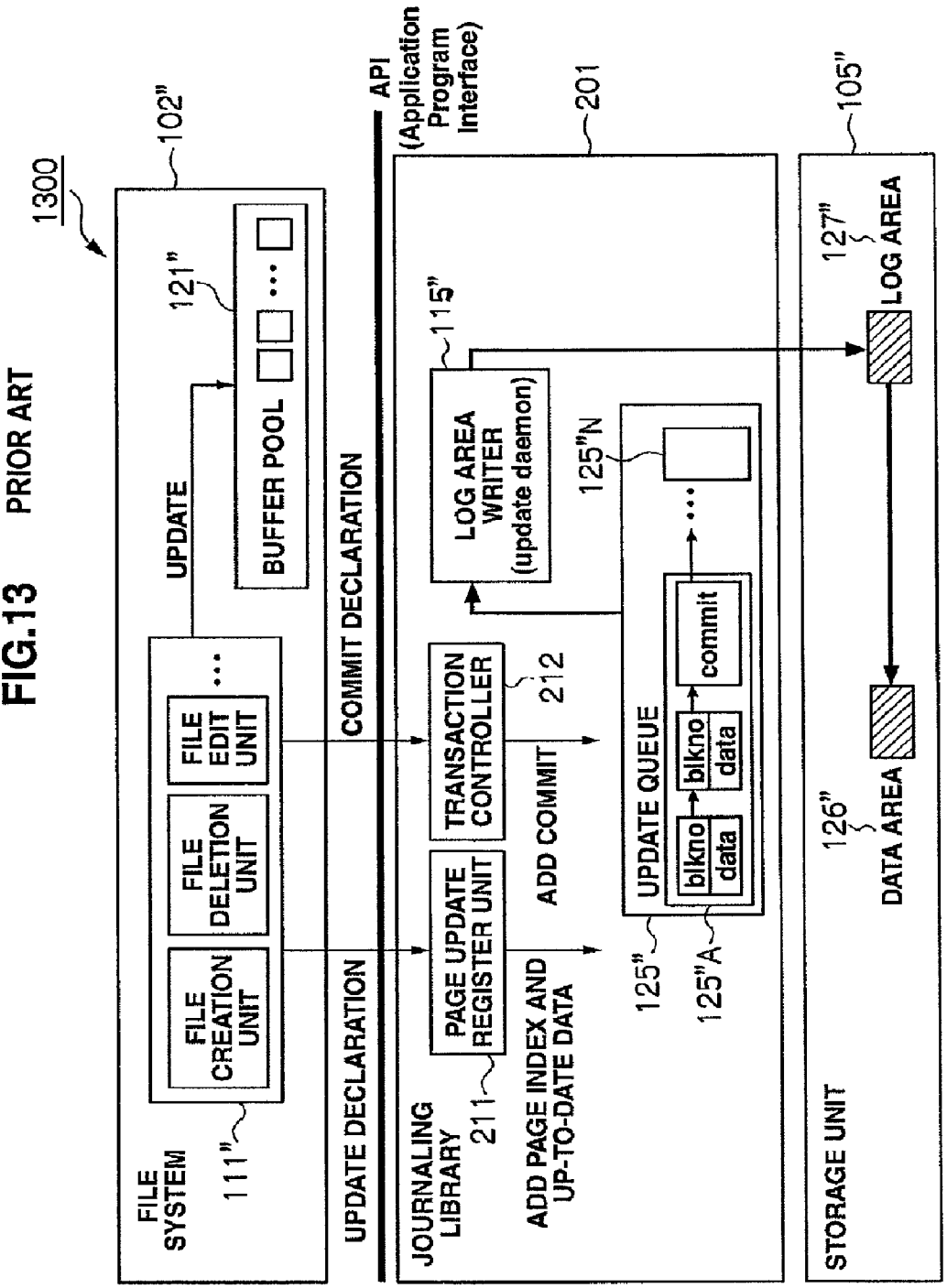
FIG. 13 is a block diagram showing the software configuration in a conventional data update history storage apparatus.

Next, a third embodiment will be described with reference to FIG. 11. The reference numeral 1100 denotes a data update history storage apparatus in the third embodiment. It should be noted that like components are assigned like reference numerals from the above first embodiment.

(3-1) Configuration of Data Update History Storage Apparatus

In the third embodiment, the data update history storage apparatus 1100 stores data update histories for a plurality of file systems 102-0 to 102-N, so the data update history storage apparatus 1100 includes HBAs 104-0 to 104-N, log areas 127-0 to 127-N, data areas 126-0 to 126-N, update queues 125-0 to 125-N, descriptors 123-0 to 123-N and cache structure snoop drivers 106-0 to 106-N that correspond respectively to the file systems 102-0 to 102-N.

Since the above components have the same configuration as their counterparts in the above first embodiment, their descriptions will be omitted.

A VM monitor 103' in the third embodiment includes a VM management table 1001.

As shown in FIG. 12, the VM management table 1001 is a table for managing execution orders for plural file systems. The VM management table 1001 includes a VM number field 1001A showing the execution number indicating a component, from among a plurality of components, on which the processing is performed; a cache structure snoop driver number field 1001B showing the cache structure snoop driver number corresponding to the execution number; an update queue number field 1001C; a descriptor number 1001D; an HBA number field 1001E; a log area number field 1001F; and a data area number field 1001G. The VM number of a component that is being executed by the CPU 311 is displayed in the "currently-being-processed VM number" 1002.

(3-2) Operation of I/O Request Catcher

The start trigger for the I/O request catcher 112' is the same as in step S501 in the above first embodiment. The CPU 311 changes step S503 in FIG. 5 as follows.

Specifically, the CPU 311 checks the currently-being-processed VM number 1002 and then acquires the corresponding cache structure snoop driver, update queue number, descriptor number, HBA number, log area number and data area number from the VM management table 1001. In the following description, the currently-being-processed VM number will be shown as "1" and the corresponding numbers will be shown as "XXX-1" (X represents arbitrary numbers), for the convenience of explanation.

Then the CPU 311 refers to the descriptor 123-1 corresponding to the HBA number 104-1, acquires a transmission source buffer address and changes the authorized access of the relevant address in the page table 124 to "read only."

The CPU 311 then selects at random the VM number to be executed next and identifies the file system corresponding to this VM number, and the CPU 311 again executes the processing in step S501.

(3-3) Operation of Page Exception Catcher

The start trigger of the page exception catcher 113' is same as that in step S601 in the above first embodiment. The CPU 311 changes steps S603 and S605 in FIG. 6 as follows.

Specifically, the CPU 311 checks the currently-being-processed VM number 1002 and acquires the HBA number 104-1 corresponding to the currently-being-processed VM number 1 from the VM management table 1001. Then the CPU 311 starts the cache structure snoop driver 106-1 corresponding to this currently-being-processed VM number. In this step, the CPU 311 specifies the buffer address that was received with the relevant page exception occurrence report.

In step S605, the CPU 311 adds the acquired buffer address and block number in the update queue 125-1 corresponding to the VM number acquired in step S603.

Next, the CPU 311 selects at random the VM number to be executed next and identifies the file system corresponding to this VM number, and again performs the processing in step S601.

(3-4) Operation of System Call Catcher

The start trigger of the system call catcher 114' is same as that in step S701 in the above first embodiment. The CPU 311 changes step S703 in FIG. 7 as follows.

Specifically, in step S703, the CPU 311 checks the currently-being-processed VM number 1002 and then acquires the HBA number 104-1 corresponding to the currently-being-processed VM number 1 from the VM management table 1001. Then the CPU 311 start the cache structure snoop driver 106-1 corresponding to the currently-being-processed VM number.

The CPU 311 adds a commit entry in the update queue 125-1 corresponding to the currently-being-processed VM number.

The CPU 311 then selects at random the VM number to be executed next and identifies the file system corresponding to this VM number, and again performs the processing in step S701.

(3-5) Operation of Log Area Writer

The log area writer 115' is started when, after the CPU 311 checks the currently-being-processed VM number 1002, an update history is added in the update queue 125-1 corresponding to the currently-being-processed VM number 1 in the VM management table 1001.

Then the CPU 311 performs the processing from steps S802 to S805 for the HBA 104-1, the log area 127-1 and the data area 126-1 that correspond to the currently-being-processed VM number 1.

The CPU 311 then selects at random the VM number to be executed next and identifies the file system corresponding to this VM number, and again performs the processing in step S801.

The CPU 311 repeats the log area writer operation (steps S801 to S805) until the update histories stored in all the update queues 125-0 to 125-N are transferred to the log areas 127-0 to 127-N and the data areas 126-0 to 126-N.

As described above, even if the data update history storage apparatus has plural cache structure snoop drivers, update queues, descriptors, HBAs, log areas and data areas corresponding to plural file systems, update histories can be stored and data update can be performed based on a command from the existing file systems.

(3-6) Advantage of Third Embodiment

According to the above method in this embodiment, update histories can be stored and data update can be performed based on existing file systems without modifying the source codes of the existing file systems.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A data update history storage apparatus that stores update data, the apparatus comprising:
   a buffer pool that temporarily stores the update data;
   a page management unit that sets authorized access for each buffer address for buffer data stored in the buffer pool;
   an address management unit that manages the correlation between a buffer address where the update data is stored in the buffer pool and a data area address where the relevant update data is stored;
   an I/O (input/output) command catcher that changes, when an I/O command is issued in order to store arbitrary update data in a data area address corresponding to a buffer address storing the arbitrary update data, the authorized access that has been set for the arbitrary update data in the page management unit to be readable; and
   a page exception catcher that issues a page exception report when the authorized access set for the arbitrary update data is changed to readable, acquires the data area address corresponding to the buffer address that stores the arbitrary update data from the address management unit, and stores the update data and an update history of the update data in an update queue.

2. The data update history storage apparatus according to claim 1, further comprising a log writer that stores in a log area the update history of the update data stored in the update queue and stores the update data in the data area address based on the update history of the update data stored in the log area.

3. The data update history storage apparatus according to claim 2, further comprising a system call return catcher that issues a system call return command and stores a commit entry indicating the end of update data stored in the buffer pool in the update queue.

4. The data update history storage apparatus according to claim 3, wherein when the commit entry is stored in the update queue and the commit entry is stored in the log area, the relevant update data is stored in the data area address.

5. The data update history storage apparatus according to claim 4, further comprising a data recovery unit that detects commit entries from all update histories stored in the log area, detects update data and data area address in which this update data is stored from each of the update histories from top entries to the commit entries, and stores the update data in the log area in the relevant data area address.

6. A data update history storage method for a data update history storage apparatus that stores update data, the method comprising:
   a storing step of temporarily storing the update data in a buffer pool;
   a page management step of setting authorized access for each buffer address for buffer data stored in the buffer pool;
   an address management step of managing the correlation between a buffer address where the update data is stored in the buffer pool and a data area address where the relevant update data is stored;
   an I/O (input/output) command catching step of changing, when an I/O command is issued in order to store arbitrary update data in a data area address corresponding to a buffer address storing the arbitrary update data, the authorized access that has been set for the corresponding arbitrary update data in the page management unit to be readable; and
   a page exception catching step of issuing a page exception report when the authorized access set for the arbitrary update data is changed to readable, acquiring the data area address corresponding to the buffer address that stores the arbitrary update data from the address management unit, and storing the update data and an update history of the update data in an update queue.

7. The method according to claim 6, further comprising a log write step of storing in a log area the update history of the update data stored in the update queue and storing the update data in the data area address based on the update history of the update data stored in the log area.

8. The method according to claim 7, further comprising a system call return acquisition step of issuing a system call return command and storing a commit entry indicating the end of update data stored in the buffer pool in the update queue.

9. The method according to claim 8, wherein when the commit entry is stored in the update queue and the commit entry is stored in the log area, the relevant update data is stored in the data area address.

10. The method according to claim 9, further comprising a data recovery step of detecting commit entries from all update histories stored in the log area, detecting update data and data area address in which this update data is stored from each of the update histories from top entries to the commit entries, and storing the update data in the log area in the relevant data area address.

* * * * *